Aug. 24, 1937.  J. M. KING  2,090,843
PRESSURE EQUALIZING VALVE
Filed April 10, 1936  2 Sheets-Sheet 2
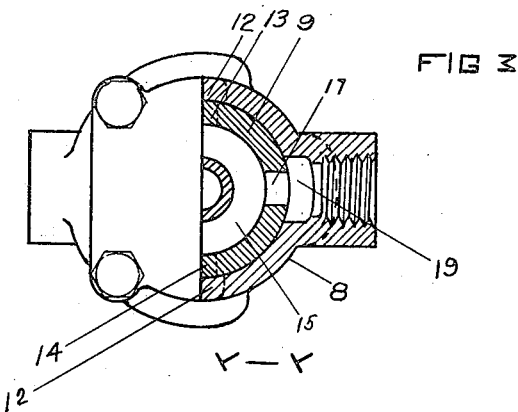
FIG. 6 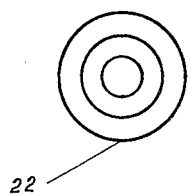 FIG. 5 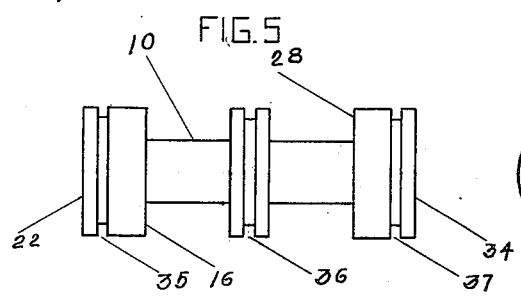 FIG. 7 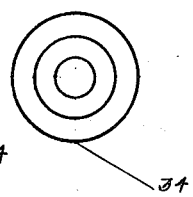
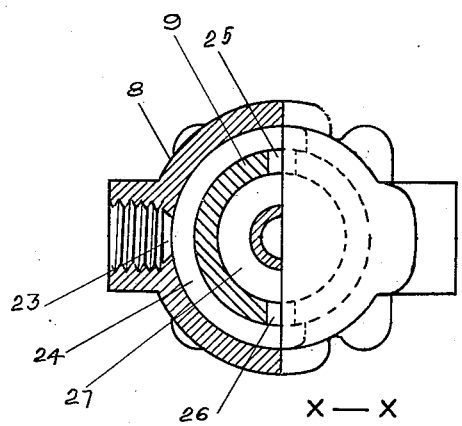
Joseph Marion King
INVENTOR.
BY
ATTORNEY.

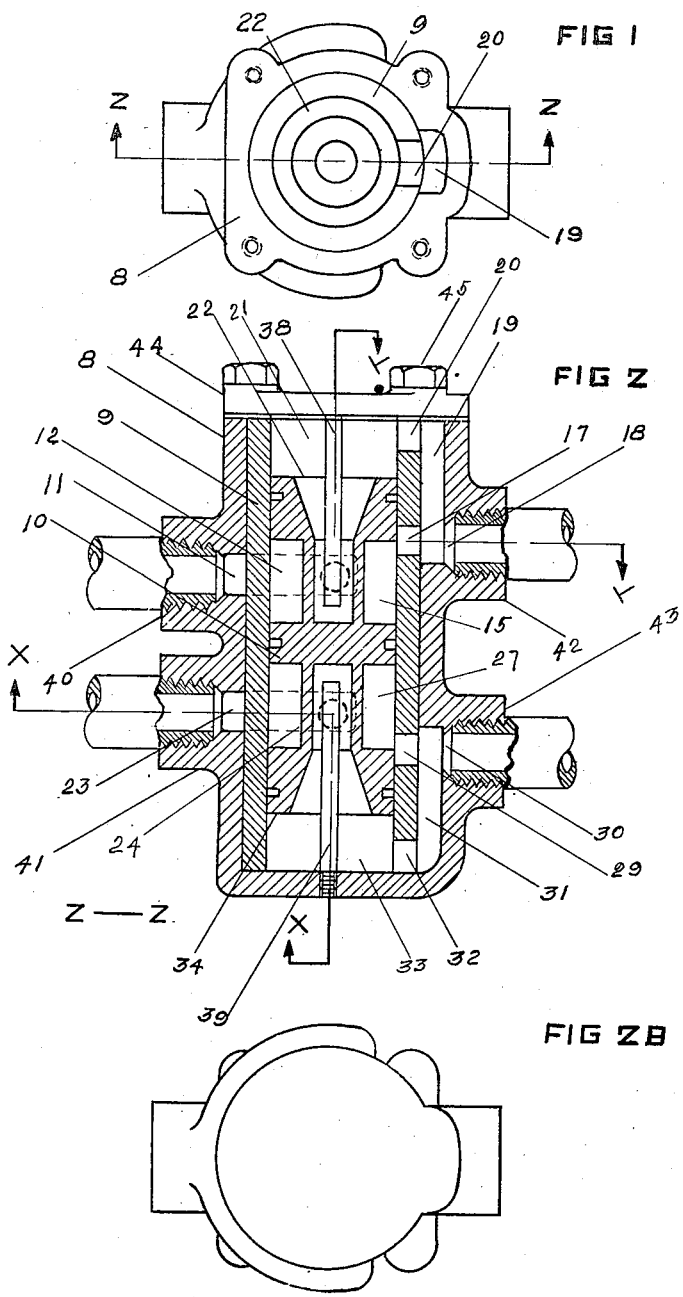

Patented Aug. 24, 1937

2,090,843

UNITED STATES PATENT OFFICE 2,090,843

PRESSURE EQUALIZING VALVE

Joseph Marion King, Detroit, Mich.

Application April 10, 1936, Serial No. 73,662

7 Claims. (Cl. 277—3)

My invention relates to pressure-equalizing valves, especially to that type employed in connection with shower bath devices, and hot and cold water mixers where temperature control is desirable.

One of the objects sought, is to provide a pressure equalizing device solely dependent on unlike pressures, dependable, consistent in performance, simple in construction and economically produced; a device to invariably maintain an identical pressure in various fluid lines, and adaptability to installation in connection with any and all devices where an equalization of unlike pressures is necessary.

The invention contemplates a tubular receptacle of valvular finish, and therein mounted a valve-fitting cylindrical member, such member providing a plurality of fluid passages and subjected to unlike pressures applicable to its respective ends.

The invention consists in the construction and combination of parts as hereinafter set forth and more particularly described in the detailed specification and pointed out in the appended claims.

This application is a continuation in part of application Serial Number 693,845, filed Oct. 16, 1933.

Through the various drawings like numerals are adapted to designate like parts.

Referring to the drawings:

Figure 1 is a plan view of a pressure-equalizing valve embodying the invention.

Figure 2 is a vertical cross section of the device on the line z—z of Figure 1.

Figure 2B is a bottom view.

Figure 3 is a partial section on the line y—y of Figure 2.

Figure 4 is a partial section on the line x—x of Figure 2.

Figure 5 is a view of a valve-fitting cylindrical member as disclosed in Figure 2.

Figures 6 and 7 are end views of the said cylindrical member identical in form as illustrated in Figure 2.

The numeral 8 represents a casting suitably cored to form fluid passages. Into this casting is, fluid-tightly, pressed a valve-fitting sleeve 9 for the reception of a valvular cylindrical member 10.

A cold water ingress opening 11 is formed in the said casting and made connective with a channel 12. Inlets 13 and 14 are formed in the sleeve 9 and made communicable with a cold water primary chamber 15, formed by a circumferential recess 16 machined in the top portion of the cylindrical member 10. A correspondent cold water outlet 17 to inlets 13 and 14, is formed in the sleeve 9 and made connective with an egress opening 18 and a fluid conduit 19 formed in the said casting.

An opening 20 is formed in the top portion of the sleeve 9 making connective the fluid conduit 19 and a cold water pressure-regulating chamber 21 formed of the top area of the sleeve 9, the top end of the cylindrical member 10 constituting the bottom wall 22 thereof.

A hot water ingress opening 23 is formed in the said casting and made connective with a channel 24. Inlets 25 and 26 are formed in the sleeve 9 and made communicable with a hot water primary chamber 27, formed by a circumferential recess 28 machined in the bottom portion of the cylindrical member 10. A correspondent hot water outlet 29 to exits 25 and 26, is formed in the sleeve 9 and made connective with an egress opening 30 and a fluid conduit 31 formed in the said casting.

An opening 32 is formed in the bottom portion of the sleeve 9 making connective the fluid conduit 31 and a hot water pressure-regulating chamber 33, formed of the bottom area of the sleeve 9, the bottom end of the cylindrical member 10 constituting the top wall 34 thereof. Recesses 35, 36 and 37 are formed in the cylindrical member 10 for the reception of packing. Stops 38 and 39 are provided to limit the upward and downward movement of the said cylindrical member.

Bosses 40, 41, 42 and 43 are formed on the said casting and suitably machined for pipe engagement. The top or cover 44 is adapted to be held in fluid-tight relation with the body casting by means of cap screws 45.

The manner of functioning is obvious. Cold water entering the chamber 15 exerts a pressure in the pressure-regulating chamber 21 which tends to cause the member 10 to move downward and close the outlet 17, thus causing a reduction of pressure in the chamber 21. The member 10, so actuated, tends to increase the opening of the hot water outlet 29 which raises the pressure in the hot water pressure-regulating chamber 33, thus subjecting the member 10 to a counteracting pressure.

A critical position of the member 10 is caused by this action; the higher pressure line reduces its flow, while the flow of the lower pressure line is increased. The higher pressure in one of the primary chambers exerts such a pressure in its corresponding pressure-regulating chamber as to match or balance that obtaining in the other pressure-regulating chamber, the effect being a similar pressure in both, the hot and cold water outlets, such pressure being that of the lower pressure line.

What I claim as new is:

1. A fluid pressure-equalizing valve comprising a valve-fitting tubular casing; a valvular cylindrical member mounted therein and movably responsive to the influence of gravitation; the said member having on its side near each end a recess constituting fluid primary chambers, to which fluid pressure-equalizing inlets are respectively formed in the said tubular casing; correspondent fluid primary chamber outlets formed in the said tubular casing and made communicable each with a pressure chamber formed in each end of the said tubular casing; means to prevent the passage of fluid, via the interior of the valve-fitting tubular casing, from a fluid primary chamber to a pressure chamber; the said cylindrical member adapted to oscillate in response to unlike pressures and effect an equalization thereof.

2. A fluid pressure-equalizing valve comprising a valve-fitting tubular casing; a valvular cylindrical member mounted therein; the said member having on its side near each end a recess constituting fluid primary chambers, to which fluid pressure-equalizing inlets are respectively formed in the said tubular casing; correspondent fluid primary chamber outlets formed in the said tubular casing and made communicable each with a pressure chamber formed in each end of the said tubular casing; the said cylindrical member adapted to oscillate in response to unlike pressures and effect an equalization thereof.

3. A fluid pressure-equalizing valve comprising a valve-fitting tubular casing; a valvular cylindrical member mounted therein and movably responsive to the influence of gravitation; the said member having on its side near each end a recess constituting fluid primary chambers, to which pressure-equalizing inlets are respectively formed in the said tubular casing; correspondent fluid primary chamber outlets formed in the said tubular casing and made communicable each with a pressure chamber formed in each end of the said tubular casing; the said cylindrical member adapted to oscillate in response to unlike pressures and effect an equalization thereof.

4. A fluid pressure-equalizing valve comprising a valve-fitting tubular casing, a valvular cylindrical member mounted therein; the said member having on its side near each end a recess constituting fluid primary chambers, to which fluid pressure-equalizing inlets are respectively formed in the said tubular casing; correspondent fluid primary chamber outlets formed in the said tubular casing and made communicable each with a pressure chamber formed in each end of the said tubular casing; means to prevent the passage of fluid, via the interior of the valve-fitting tubular casing, from a fluid primary chamber to a pressure chamber; the said cylindrical member adapted to oscillate in response to unlike pressures and effect an equalization thereof.

5. A fluid pressure-equalizing valve comprising a valve-fitting tubular casing; a valvular cylindrical member mounted therein and movably responsive to the influence of gravitation; the said member having on its side near each end a recess constituting fluid primary chambers, to which a fluid inlet is formed respectively in the said tubular casing; correspondent fluid primary chamber outlets formed in the said tubular casing and made communicable each with a pressure chamber formed in each end of the said tubular casing; the said cylindrical member adapted to oscillate in response to unlike pressures and effect an equalization thereof.

6. A fluid pressure-equalizing valve comprising a valve-fitting tubular casing; a valvular cylindrical member mounted therein; the said member having on its side near each end a recess constituting fluid primary chambers, to which a fluid inlet is formed respectively in the said tubular casing; correspondent fluid primary chamber outlets formed in the said tubular casing and made communicable each with a pressure chamber formed in each end of the said tubular casing; means to prevent the passage of fluid, via the interior of the valve-fitting tubular casing, from a fluid primary chamber to a pressure chamber; the said cylindrical member adapted to oscillate in response to unlike pressures and effect an equalization thereof.

7. A fluid pressure-equalizing valve comprising a valve-fitting tubular casing; a valvular cylindrical member mounted therein and movably responsive to the influence of gravitation; the said member having on its side near each end a recess constituting fluid primary chambers, to which a fluid inlet is formed respectively in the said tubular casing; correspondent fluid primary chamber outlets formed in the said tubular casing and made communicable each with a pressure chamber formed in each end of the said tubular casing; means to prevent the passage of fluid, via the interior of the valve-fitting tubular casing, from a fluid primary chamber to a pressure chamber; the said cylindrical member adapted to oscillate in response to unlike pressures and effect an equalization thereof.

JOSEPH MARION KING.